US012481602B2

(12) United States Patent
Evans

(10) Patent No.: US 12,481,602 B2
(45) Date of Patent: Nov. 25, 2025

(54) PREVENTING UNAUTHORIZED MEMORY ACCESS USING A PHYSICAL ADDRESS ACCESS PERMISSIONS TABLE

(71) Applicant: NVIDIA Corporation, Santa Clara, CA (US)

(72) Inventor: Jonathon Evans, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/671,144

(22) Filed: Feb. 14, 2022

(65) Prior Publication Data

US 2023/0259464 A1 Aug. 17, 2023

(51) Int. Cl.
*G06F 12/14* (2006.01)
*G06F 12/1072* (2016.01)
*G06F 12/1081* (2016.01)
*G06F 21/78* (2013.01)

(52) U.S. Cl.
CPC .. *G06F 12/1483* (2013.01); *G06F 2212/1052* (2013.01); *G06F 2212/657* (2013.01)

(58) Field of Classification Search
CPC ......... G06F 12/1483; G06F 2212/1052; G06F 2212/657
USPC ........................................................ 711/163
See application file for complete search history.

(56) References Cited

U.S. PATENT DOCUMENTS

| | | | |
|---|---|---|---|
| 2008/0091855 A1* | 4/2008 | Moertl | G06F 12/1081 710/52 |
| 2011/0161620 A1* | 6/2011 | Kaminski | G06F 12/1081 711/E12.001 |
| 2016/0124877 A1* | 5/2016 | Hefty | G06F 13/28 710/308 |
| 2017/0308425 A1* | 10/2017 | Hicks | G06F 12/10 |
| 2018/0129611 A1* | 5/2018 | Parker | G06F 12/1009 |
| 2019/0034350 A1* | 1/2019 | Lemay | G06F 12/1009 |
| 2020/0310997 A1* | 10/2020 | Chen | G06F 12/1036 |
| 2021/0063200 A1* | 3/2021 | Kroepfl | G01C 21/1652 |
| 2021/0064525 A1* | 3/2021 | Tian | G06F 12/1081 |
| 2022/0114104 A1* | 4/2022 | LeMay | G06F 12/1027 |
| 2023/0176984 A1* | 6/2023 | Liu | G06F 12/1441 711/163 |

* cited by examiner

*Primary Examiner* — Arpan P. Savla
*Assistant Examiner* — Sidney Li
(74) *Attorney, Agent, or Firm* — Iron Summit IP L.L.P.

(57) ABSTRACT

A host may use address translation to convert virtual addresses to physical addresses for endpoints, which may then submit memory access requests for physical addresses. The host may record permissions granting entities access to physical addresses in physical address access permissions tables (PAAPTs) responsive to the address translation. The security of address translation services may be increased based at least on verifying memory access requests are authorized using the PAAPTs. For example, an entity identifier included in a request may be used to locate a corresponding PAAPT, and a physical address may be extracted from the request and used to locate an entry indicating whether an entity corresponding to the entity identifier has permission to access the physical address. Where the entity has permission, the system may perform the memory access using the physical address. Otherwise an error or fault code may be provided in response to the request.

20 Claims, 7 Drawing Sheets

PREVENTING UNAUTHORIZED MEMORY ACCESS USING A PHYSICAL ADDRESS ACCESS PERMISSIONS TABLE

BACKGROUND

PCI Express (PCIe) provides for Address Translation Services (ATS) where a host may use a translation agent to translate a virtual address, provided by an endpoint (e.g., a device interfacing with a root port), to a physical address in memory. The endpoint may cache translations from the translation agent and subsequently use physical addresses derived from the cached translations to request Direct Memory-Access (DMA) transfers. Thus, the translation agent may not be required to perform translation for the DMA transfers, reducing memory access latency and the burden of the translation agent performing address translation.

However, when requesting a DMA transfer, there is a chance that the physical address included in the request is not one that the endpoint is authorized to access. In various circumstances, such as where the endpoint corresponds to an external device, it may not be possible to trust that the endpoint will not attempt an unauthorized access and so ATS is often disabled. As a further complication, the host may include multiple Virtual Machines (VMs) where an endpoint is part of a Trusted Execution Environment (TEE) of one VM and not the other. In this case, the host should be capable of guaranteeing that the endpoint cannot access the memory of the VM that does not include the endpoint in its TEE, but this may not be possible.

SUMMARY

Embodiments of the present disclosure relate to preventing unauthorized memory access using a physical address access permissions table. Systems and methods are disclosed which may use a permissions table to verify whether an entity associated with a request for memory access to a physical address is authorized to access the physical address. Disclosed approaches may be used to enhance the security of memory access, such as in Address Translation Services.

In contrast to conventional systems, such as those described above, disclosed approaches may record permissions corresponding to one or more entities and one or more physical addresses (PAs). A request from an entity for memory access using a physical address may be authorized by determining one or more of the permissions grant the entity access to the physical address.

In at least one embodiment, permissions granting entities access to physical addresses may be recorded in physical address access permissions tables responsive to translation requests. For example, a permission may be granted to an entity based at least on the entity being authorized to receive the physical address, translated from a logical address, responsive to a translation request. Responsive to receiving a memory access request associated with a physical address, the system may search for a permission granting the entity and/or endpoint associated with the request access to the physical address. For example, an entity identifier included in the request may be used to locate a corresponding physical address access permissions table, and the physical address may be extracted from the request and used to locate an entry indicating whether the entity has the permission. Where the entity has the permission, the system may perform the memory access using the physical address. Otherwise an error or fault code may be provided in response to the request.

BRIEF DESCRIPTION OF THE DRAWINGS

The present systems and methods for preventing unauthorized memory access using a physical address access permissions table are described in detail below with reference to the attached drawing figures, wherein.

DETAILED DESCRIPTION

Figure 1A:
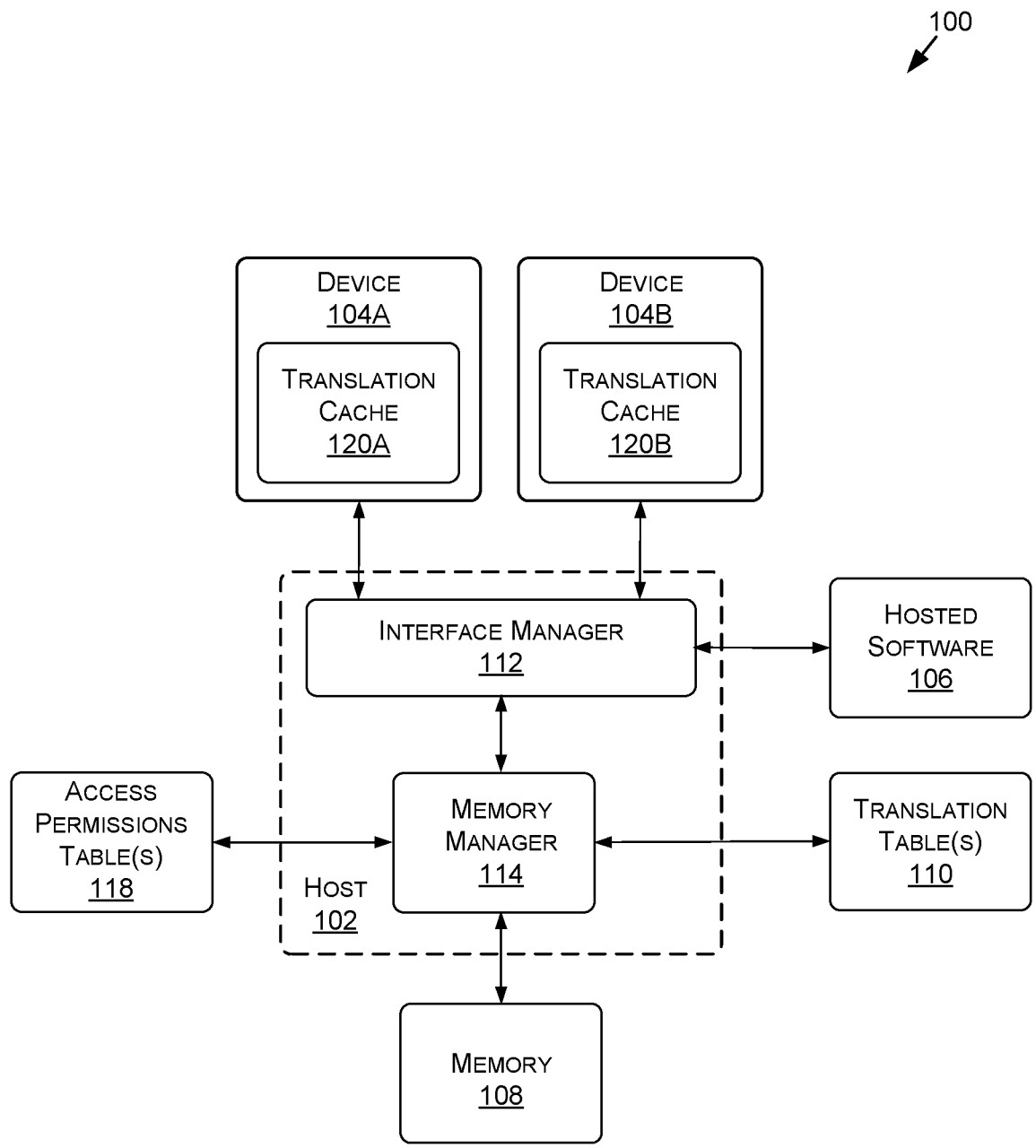
FIG. 1A is an example diagram of a memory access system including a physical address access permissions table, in accordance with some embodiments of the present disclosure.

Systems and methods are disclosed related to preventing unauthorized memory access using a physical address access permissions table. The disclosure may provide for a permissions table used to verify whether an entity associated with a request for memory access to a physical address is authorized to access the physical address. Disclosed approaches may be used to enhance the security of memory access, such as in Address Translation Services.

In one or more embodiments, a system may record permissions corresponding to one or more entities and one or more physical addresses (PAs). A request from an entity for memory access using a physical address may be authorized by determining one or more of the permissions grant the entity access to the physical address.

In at least one embodiment, permissions granting entities access to physical addresses may be recorded in physical address access permissions tables responsive to translation requests. For example, a permission may be granted to an entity based at least on the entity being authorized to receive the physical address, translated from a virtual or logical address, responsive to a translation request. Responsive to receiving a memory access request associated with a physical address, the system may search for a permission granting the entity and/or endpoint associated with the request access to the physical address. For example, an entity or requester identifier included in the request may be used to locate a corresponding physical address access permissions table, and the physical address may be extracted from the request and used to locate an entry indicating whether the entity has the permission. Where the entity has the permission, the system may perform the memory access using the physical address. Otherwise an error or fault code may be provided in response to the request.

By way of example and not limitation, disclosed approaches may be implemented using Address Translation Services (ATS) provided by PCI Express (PCIe) where a host may use a translation agent to translate the virtual address, provided by an endpoint (e.g., a device interfacing with a root port), to the physical address in memory. In addition to providing data indicating the physical address to the endpoint, a permission granting the endpoint and/or entity access to the physical address may be recorded in a physical address access permissions table (PAAPT). In at least one embodiment, each PAAPT may correspond to a respective entity identifier associated with an entity. Further, each PAAPT may be stored in a mapping table entry for the entity (e.g., a stream table entry), which may also include translation tables used to perform address translations. When the endpoint provides a memory access request for the translated address, it may include the physical address it received in a translated address field, as well as the entity identifier, such as a stream identifier, in a stream identifier field. Thus, the data can be used to locate the PAAPT and the permission to verify whether the endpoint is authorized to access the physical address.

In at least one embodiment, the host may include multiple Virtual Machines (VMs) and the endpoint may be part of a Trusted Execution Environment (TEE) of one VM and not the other. Using disclosed approaches, the host may guarantee that the endpoint cannot access the memory of the VM that does not include the endpoint in its TEE. While permissions are described as corresponding to physical address, in at least one embodiment, permissions may correspond to translated addresses, such as intermediate virtual addresses. Also, while permissions are described in relation to address translation, in at least one embodiment, permissions may be provided for physical addresses without requiring address translation. By way of example and not limitation, disclosed approaches may be implemented in various ATS and/or Compute Express Link (CXL) memory systems.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems including a collaborative creation platform for three-dimensional (3D) content, systems incorporating one or more virtual machines (VMs), systems implemented at least partially in a data center, systems implemented at least partially using cloud computing resources, and/or other types of systems.

With reference to FIG. 1A, FIG. 1A is an example diagram of a memory access system 100 including a physical address access permissions table, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The memory access system 100 may include, amongst other elements, a host 102, one or more devices, such as a device 104A and/or a device 104B (which may also be referred to collectively as "devices 104" or individually as "device 104"), hosted software 106, one or more memories 108, one or more translation tables 110, and one or more access permissions tables 118. The one or more access permissions tables 118 may also be referred to as one or more physical address access permissions tables (PAAPTs). The host 102 may include an interface manager 112 and a memory manager 114. The devices 104A or 104B may include one or more translation caches, such as a translation cache 120A of the device 104A and a translation cache 120B of the device 104B (which may also be referred to collectively as "translation caches 120" or individually as "a translation cache 120").

As an overview, the host 102 may host the hosted software 106, which may include managing execution of the hosted software 106. The interface manager 112 may be configured to manage communications between the host 102, the hosted software 106, and the devices 104. For example, a device 104 may submit requests to access one or more portions of the memory 108. The memory manager 114 may be configured to manage the memory 108, such as to facilitate access to one or more portions of the memory 108. For example, the memory manager 114 may perform such functions as using the translation table(s) 110 to translate memory addresses, updating the translation table(s) 110, reading data from or writing data to locations corresponding to memory addresses, and/or allocating one or more portions of the memory to one or more entities of the hosted software 106.

In one or more embodiments, the memory manager 114 is configured to record permissions corresponding to one or more entities and one or more physical addresses (PAs) in the PAAPT(s) 118. Also, in at least one embodiment, the memory manager 114 may be configured to verify memory access requests based on the recorded permissions in the PAAPT(s) 118, such as memory access requests provided by the devices 104 using the translation caches 120. In various examples, updates to a PAAPT 118 may be performed by a hypervisor of the host 102. As further examples, such as where there is no hypervisor and/or virtualization, updates to the PAAPT 118 may be performed by an operating system of the host 102. In various examples, PAAPT(s) 118 may be managed by a privileged entity of the host 102, which may be the same entity that manages stage 2 address translation tables (or direct virtual address to physical address translation tables).

As described herein, the host 102 may host the hosted software 106, which may include managing execution of the hosted software 106. The host 102 may comprise any combination of hardware, software, and/or firmware that facilities hosting of the hosted software 106. By way of example and not limitation, the host 102 may include one or more Virtual Machine Managers (VMM(s)) of virtualization software, such as a hypervisor, and the hosted software 106 may include one or more Virtual Machines (VMs), such as guest operating systems, supported by the hypervisor. Additionally or alternatively, at least one entity of the hosted software 106 may include one or more processes, services, applications, and/or other software entities. While the PAAPT 118, the memory 108, the hosted software 106, the translation table 110, and the devices 104 are shown outside of the host 102, any of those components may be included in the host 102 and/or on a System on Chip (SoC) with the host 102. Further, the PAAPT 118 and/or the translation tables 110 may be stored at least partially in the memory 108 and/or in different memory. In at least one embodiment, the memory 108 comprises volatile memory, such as Random-Access Memory (RAM), which may include Dynamic RAM (DRAM).

In at least one embodiment, a device 104 may comprise a VM or other software entity, such as a VM of the hosted software 106. A further example of a device 104 includes a hardware entity, such as a peripheral hardware device, non-limiting examples of which include a computer mouse or keyboard, an expansion card, a graphics card, a network card, an image scanner, a tape drive, a microphone, a webcam, or a digital camera. As used herein, examples of an entity include a hardware entity, such as a hardware device, or a software entity, such as a software entity.

The interface manager 112 may be configured to manage communications between the host 102, the hosted software 106, and the devices 104. The interface manager 112 may support any of a variety of host controller interfaces, such as those used for Universal Serial Bus (USB), FireWire, Bluetooth, Ethernet, Peripheral Component Interconnect (PCI), PCI Express (PCIe), Near-Field Communication (NFC), vehicle-to-everything (V2X), Car2Car, Cellular, Wireless Fidelity (WiFi), or other types of communications.

In at least one embodiment, the interface manager 112 may provide address translation over one or more of the host controller interfaces, such that a device 104 or other entity (e.g., an endpoint) can access one or more portions of the memory 108. In providing translation services, the interface manager 112 may use the memory manager 114 to translate an address, provided by a device 104 or other endpoint, to a translated address in the memory 108. In particular, the memory manager may use the translation table(s) 110 and/or other means to determine a translated address from an address. The translated address may be provided to the device 104, which may store the translated address in the translation cache 120. Subsequently, the device 104 may use the translated address from the translation cache 120 to provide memory access requests to the memory 108. For example, the device 104 may request a Direct Memory-Access (DMA) transfer with the memory 108 using the translated address. By using the translated address, the memory manager 114 need not perform address translation for the DMA.

In one or more embodiments, the address provided by a device 104 may be a virtual address and the translated address may be a physical address of the memory 108 determined using the translation table(s) 110 (e.g., a page table and/or Address Translation and Protection Table). However, aspects of the disclosure may be more generally applicable to address translation, which may or may not include virtual to physical address translation.

By way of example, in at least one embodiment, the interface manager 112 supports PCIe and includes a Root Complex (RC) to provide Address Translation Services (ATS) and the devices 104 may communicate with the host 102 over root ports managed by the RC. In providing ATS, the interface manager 112 may use a translation agent of the memory manager 114 to translate a virtual address, provided by a device 104, to a physical address in the memory 108. For example, the memory manager 114 may include an Input-Output Memory Management Unit (IOMMU) that uses a System Memory Management Unit (SMMU) page table(s) of the translation table(s) 110 for ATS.

When requesting a DMA transfer, there is a chance that the address provided by the device 104 is not an address the device 104 is authorized to access. As a further complication, a device 104 may be part of a Trusted Execution Environment (TEE) of one VM or other entity of the hosted software 106 and not the other. Embodiments of the disclosure allow for the host 102 to guarantee that the device 104 cannot access one or more portions of the memory 108 associated with the VM that does not include the device 104 in its TEE, even where the device 104 provides a physical address that is associated with the VM.

To this effect, the memory manager 114 may record permissions information, such entries in the PAAPT 118, which may be used to determine whether a requesting entity has one or more permissions to access one or more particular physical addresses. The permissions for one or more entities may be recorded and/or updated at any suitable time. In at least one embodiment, based at least on an address translation request the memory manager 114 may translate an address, provided by a device 104 or other endpoint, to a translated address in the memory 108. Also based at least on the address translation request, the memory manager 114 may record the one or more permissions corresponding to the translated address (e.g., a physical address) and the device 104 or other endpoint. When a device 104 or other entity provides a memory access request, the memory manager 114 may search the PAAPT(s) 118 to verify the entity associated with the request is authorized to access one or more physical addresses associated with the request. For example, the memory manager 114 may determine whether data provided by the device 104 in association with the request matches or otherwise corresponds to one or more entity identifiers and one or more physical addresses for which permissions are granted according to the PAAPT(s) 118. Where the memory manager 114 determines the request does not correspond to the cryptographic information, the request may be denied. In at least one embodiment, a status code, such as an error or fault code may be provided to the device 104 in response to a request that is not authorized.

The memory manager 114 may implement various potential approaches in order to generate and/or manage the PAAPT(s) 118. In at least one embodiment, the memory manager 114 may generate and/or manage one or more PAAPTs 118 for each device 104 and/or entity, or may employ one or more PAAPTs 118 for a group of devices and/or entities.

In at least one embodiment, a PAAPT 118 and/or one or more entries thereof may be stored in association with an entity ID and/or may be identified for verifying permissions based at least on an entity ID associated with a request for memory access. An entity ID may correspond to an identified of a single entity or a group of entities. For example, where the entity corresponds to a requestor, the entity ID may be included in the request (e.g., by the entity). In such examples, an entity ID may correspond to a requestor ID (the ID of the entity making the request). The memory manager 114 may use the entity ID to determine the PAAPT 118 and/or one or more entries, if any, associated with the entity. In various examples, where the entity is a VM on a device, the entity ID may correspond to a VM ID of the VM, and each VM may have a different VM ID. In further examples, where the entity is a device, the entity ID may correspond to a device ID of the device, and each device may have a different device ID. Using device IDs may be particularly suitable for interfaces which do not readily or explicitly support lower-level IDs.

Also in at least one embodiment, a PAAPT 118 and/or one or more entries thereof may be stored in association with a physical address and/or may be identified for verifying permissions based at least on a physical address associated with a request for memory access. For example, the request may include data indicating and/or identifying the physical address for which memory access is requested. In at least one embodiment, the request may include the physical address. By way of example and not limitation, the request may include the physical address in systems where address translation is unavailable or in systems that support ATS. Additionally or alternatively, the request may include data used by the memory manager 114 to identify the physical address (e.g., a virtual or intermediate address translated into the physical address). In various examples, the memory manager 114 may index or otherwise arrange one or more of the PAAPTs 118 by physical address and/or ranges of physical addresses.

In at least one embodiment, the memory manager 114 uses an entity ID to identify a corresponding PAAPT 118. The memory manager 114 may also use a physical address to identify an entry in the corresponding PAAPT 118. The entry may indicate whether an entity corresponding to the entity ID has permission to access the physical address. In at least one embodiment, permissions for one or more physical address may be recorded in a PAAPT 118 using one or more permissions bits. For example, a permission may be recorded using a single permissions bit with a first value (e.g., 1) corresponding to access allowed and a second value (e.g., 0) corresponding to access denied. In other examples, more than one bit may be used. Further, permissions for a particular physical address(es) may be subdivided by access type, such as read, write, etc. However, recording a single permission using a single bit may allow for a small memory size while still being suitable for many applications, including ATS.

In at least one embodiment, a PAAPT 118 may include one or more permissions bits indexed by one or more physical addresses (e.g., a single physical address or a range or other group of physical addresses). In at least one embodiment, a PAAPT 118 may be stored in a page table format, where rather than storing mappings between logical addresses and physical addresses, as in a page table, the PAAPT 118 may store mappings between physical addresses and permissions bits. In at least one embodiment, the PAAPT 118 may store one or more permissions bits per page, such as a single permissions bit per page. Using a single permissions bit per page may allow for more entries to be maintained in a permissions check cache the memory manager 114 may use to verify permissions without having to go to memory to perform a look up in the PAAPT 118, thereby improving performance. For example, using a single permissions bit per page may allow for table compression where entire ranges of addresses may be packed. For example, the permissions of an entry in a PAAPT 118 may form a bitmap, allowing for bitmap compression.

In one or more embodiments, the PAAPT(s) 118 may be stored using one or more translation granules of the address translation tables of the memory access system 100. For example, a PAAPT 118 may be stored using the smallest granule of the memory access system 100. Non-limiting examples include 4 kb, 64 kb, or 16 KB granules. A PAAPT 118 may correspond to a multi-level table structure, such as a two-level structure. A top level for a PAAPT 118 may include a pointer to a next level table or the top level. By way of example and not limitation, a PAAPT 118 may include a 32 bit leaf entry. Each bit may cover at least 4 kb of permissions. Thus, assuming a 4 byte word, permissions of 128 kb of the memory 108 may be recorded using a 32 bit entry. In a page table, each entry would be 64 bytes and provide translation for a 4 kb page. By configuring the PAAPT 118 in a page table format, permissions for thirty two 4 kb pages can be packed into one 4 byte structure. However, various storage formats for the PAAPT(s) 118 are compatible with the present disclosure. The PAAPT(s) 118 may be stored as one or more linked lists, or be of a fixed size, or be stored using a combination of storage formats.

Figure 1B:
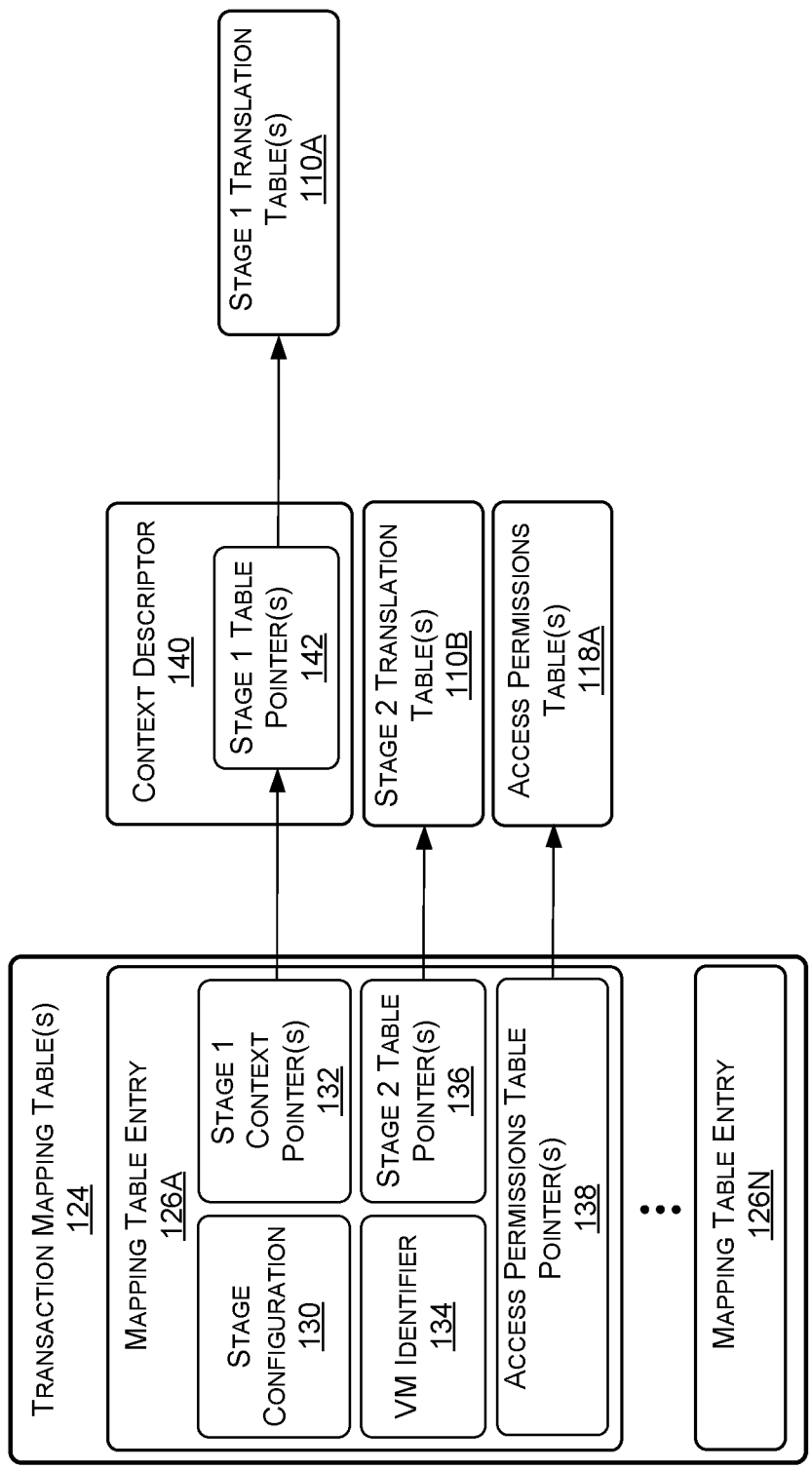
FIG. 1B is an example diagram of a transaction mapping table which may include a physical address access permissions table, in accordance with some embodiments of the present disclosure.

In at least one embodiment, one or more of the PAAPTs 118 may be stored in one or more transaction mapping tables, an example of which is shown in FIG. 1B. Referring now to FIG. 1B, FIG. 1B is an example diagram of a transaction mapping table 124 which may include a physical address access permissions table, in accordance with some embodiments of the present disclosure. The transaction mapping table 124 may include one or more mapping table entries 126A through 126N (which may also be referred to as "mapping table entries 126"). In embodiments where the PAAPTs 118 is included in an ARM architecture, the transaction mapping table 124 may be a stream entry table with the mapping table entries 126 being stream table entries. However, this is not intended to be limiting, and a PAAPT 118 may be incorporated into other architectures and addressing structures and/or systems.

In at least one embodiment, a stream ID may be used to map a transaction, such as a transaction corresponding to a request for memory access or a request for address translation, to a corresponding mapping table entry 126. Also in at least one embodiment, a stream ID may be used as an entity ID. For example, each stream ID from the same device may point at the same PAAPT 118. Thus, one or more embodiments may use an entity ID that is defined, assigned, specified, and/or managed by the memory access interface. Using such an entity ID may allow for use of security mechanisms of the memory access interface to prevent potential security issues, such as entity ID spoofing without requiring additional mechanisms. For example, PCIe includes security checks to ensure a device that makes a request does so over a cryptographically secure link, and that the stream ID is in a range the device is allowed to use. In other examples, an entity ID and/or security mechanism may be included that is separate from the memory access interface.

By way of example, and not limitation, each mapping table entry 126A may include, amongst other features not shown, a stage configuration 130, a stage 1 context pointer(s) 132, a VM Identifier 134, a stage 2 table pointer(s) 136, and an access permissions table pointer(s) 138. In at least one embodiment, the VM identifier 134 may be used as an entity ID, in addition to or instead of a stream ID. In one or more embodiments, the each VM is assigned a VM Identifier, which may be used to tag translation lookaside buffer (TLB) entries, to identify which entry belongs to which VM. This tagging may be used to allow translations for multiple different VMs to be present in the TLBs at the same time. In at least one embodiment, this tagging may be additionally or alternatively be used to allow permissions for multiple different VMs and/or entities to be present in one or more physical address permissions caches at the same time.

Further, in one or more embodiments, the VM may be a different type of entity describe herein.

The stage configuration 130 may be used to configure the type of translation associated with the mapping table entry 126. For example, the stage configuration 130 may be used to select between bypassing using both stage 1 and stage 2 translation, using stage 1 translation and bypassing stage 2 translation, bypassing stage 2 translation and using stage 2 translation, using both stage 1 translation and stage 2 translation, and/or other translation modes or stages which may be supported by the system. Disclosed approaches may be used in combination with any of these various configurations. For example, in at least one embodiment, a configuration bit may indicate to the memory manager 114 that both stage 1 and stage 2 are disabled, and the memory manager 114 may still use a mapping table entry 126 to verify permissions of physical addresses.

Stage 1 may be configured to translate a virtual address into a physical address or into an intermediate virtual address depending on the mode that is selected by the stage configuration 130 and/or supported by the system. Stage 2 may be configured to translate an intermediate virtual address to a physical address. While the present example includes two stages, any number of stages may be used in various embodiments, such as a single stage.

The stage 1 context pointer 132 may point to a context descriptor 140 (e.g., a context descriptor table). The context descriptor 140 may include data defining how stage 1 translation is to be performed and may include one or more stage 1 table pointers 142. The stage 1 table pointer(s) 142 may point to one or more stage 1 translation table(s) 110A used for translation in stage 1. In other examples, the context descriptor 140 need not include the stage 1 table pointer(s) 142 or need not be included in a mapping table entry 126A.

The stage 2 table pointer(s) 136 may point to one or more stage 2 translation table(s) 110B used for translation in stage 2. Further, the access permissions table pointer(s) 138 may point to one or more PAAPT(s) 118A used for verifying memory access permissions of one or more entities.

In at least one embodiment, the memory manager 114 or other component may generate one or more mapping table entries 126 for one or more entities as part of registering the one or more entities with the memory access system 100 for memory access. For example, a mapping table entry 126 may be generated for a device based at least on the device connecting to the host 102 and/or requesting registration with the memory access system 100. In at least one embodiment, a mapping table entry 126 may be generated for an entity as part of a boot up process of an operating system (OS), such as an OS of the host 102 and/or a VM. For example, when an OS boots up, the OS may identify and/or inspect devices associated with the OS. Based on the identification, the OS may register corresponding mapping table entries 126. In embodiments where a PAAPT 118 is included in a mapping table entry 126, the PAAPT 118 and/or one or more permissions thereof may be generated, allocated, and/or updated as part of the registration process for the devices and/or entities (e.g., as part of generating a mapping table entry 126).

Additionally or alternatively, a PAAPT 118 and/or one or more permissions thereof may be generated, allocated, and/or updated at other suitable times. For example, a PAAPT 118 and/or one or more permissions thereof may be generated, allocated, and/or updated for an entity based at least on a translation request from and/or associated with the entity. For example, the request may include and/or indicate an entity ID, such as a stream ID, which the memory manager 114 or other component may use to identify the mapping table entry 126 for the PAAPT 118. Additionally, the request may include and/or indicate an address to be translated, such as an intermediate virtual address. The memory manager 114 or other component may use the address to determine the physical address(es) for which one or more permissions are granted, such as based at least on a result of a translation responsive to the translation request.

The memory manager 114 and/or other components of the memory access system 100 may use the transaction mapping table(s) 124 for address translation. For example, the transaction mapping table 124 may be used to map a transaction to a transaction stream and its corresponding translation context. In at least one embodiment, a permission granting access to an entity or endpoint may be terminated in association with invalidation of the entity or endpoint's translation cache (e.g., upon determining a pre-determined period of time having elapsed, upon determining an entity of the hosted software 106 has revoked access to and/or modified a translated address, upon determining a translated address no longer belongs to the entity, based on terminating the entity owning the translated address, etc.).

The memory manager 114 may assign one or more permissions to one or more particular entities (e.g., a device 104), functions, and/or processes. Further the memory manager 114 may store such assignments in the PAAPT(s) 118 for use in verifying permissions for future communications from an entity. The memory manager 114 may generate and/or assign permissions at any suitable time.

In embodiments where the hosted software 106 includes a VM, the memory manager 114 may allocate permissions for a device, function, process, etc., based at least on the entity (e.g., an endpoint) being moved into the TEE of the VM. For example, in response to a request to move the entity into the TEE, the memory manager 114 may generate and/or assign one or more permissions to the entity (e.g., one permission per entity, process, and/or function). As a further example, a permission may be generated or assigned in response to an address translation request from the entity. In at least one embodiment, the memory manager 114 may store permissions in the PAAPT(s) 118 by entity, function, process, and/or session.

The memory manager 114 may access the PAAPT(s) 118 to generate and/or provide permissions to a physical address to an entity and/or verify one or more requests from the entity. For example, the memory manager 114 may use information provided by and/or associated with the entity (e.g., in a request from the entity) as lookup criteria to access one or more associated entries used to generate a PAAPT 118 and/or to generate or update a PAAPT 118 and/or one or more permissions thereof.

In at least one embodiment, the memory manager 114 grants one or more permissions in response to a translation request. For example, the memory manager 114 may include provide a translated address and grant one or more permissions for the translated address responsive to a translation request. In at least one embodiment, the memory manager 114 may receive the translation request from a device 104. Amongst other potential information, the translation request may include data indicating an address to be translated (e.g., a virtual address). Responsive to the request, the memory manager 114 may look up the address in the translation table 110 and receive the corresponding translated address (e.g., a system physical address). The memory manager 114 may also generate and/or access one or more entries in a PAAPT 118 associated with the translated address to grant the one or more permissions.

In at least one embodiment, the memory manager 114 may verify translated requests based on the one or more permissions associated with one or more translated addresses. For example, the host 102 may receive a translated request from a device 104 (e.g., a memory access request, such as a DMA request). The memory manager 114 may analyze the translated request to verify the entity has one or more permissions associated with a translated address authorized for the requesting endpoint, process, and/or function. In at least one embodiment, the translated address may be extracted from a translated address field of the request, and an entity ID may be extracted from an entity ID field of the request. The extracted data may then be used to lookup one or more entries in the PAAPT 118, if present.

Where the memory manager 114 fails to identify a corresponding permission, the request may result in an error or failure code, which may be provided to the device 104. Where the information is identified, the request may match or otherwise correspond to a permission assigned to the endpoint, process, function, etc.

As described herein, where the memory manager 114 determines a permission does not match or otherwise correspond to a request, the request may result in an error or fault code, which may be provided to the device 104. Otherwise, the memory manager 114 may use a translated address provided by the request, for example, to perform a memory access on corresponding locations in the memory 108. The memory manager 114 may further provide to the device 104, in response to the request, data indicating successful verification and/or execution of the translated request, such as a success code and/or retrieved data. Disclosed approaches may be implemented completely in hardware, without requiring modification to the hosted software 106.

Figure 2:
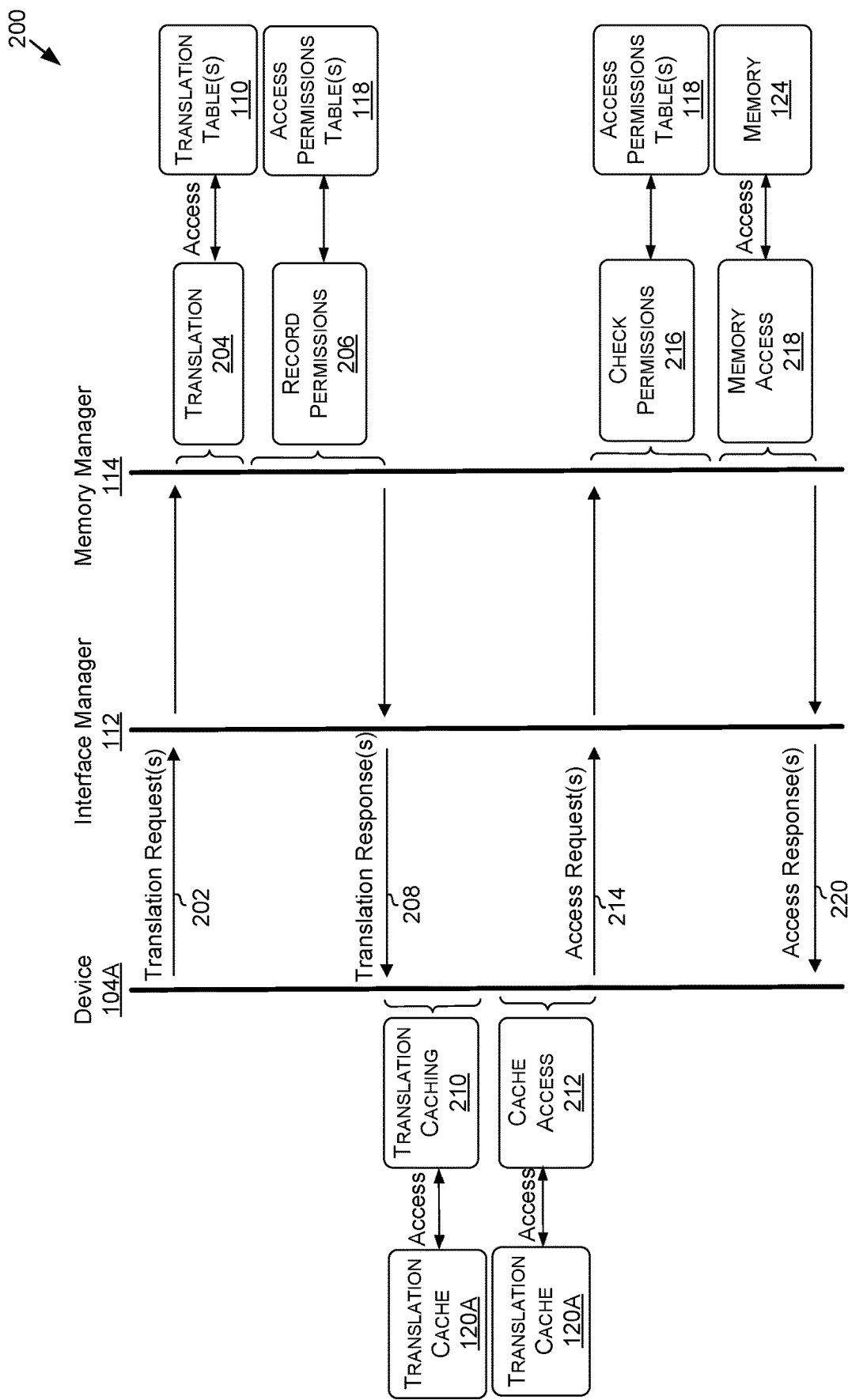
FIG. 2 illustrates an example process of preventing unauthorized translated access using a physical address access permissions table in the memory access system of FIG. 1A, in accordance with some embodiments of the present disclosure.

Referring now to FIG. 2, FIG. 2 illustrates an example process 200 of preventing unauthorized translated access using a physical address access permissions table in the memory access system 100 of FIG. 1, in accordance with some embodiments of the present disclosure. The process 200 may include the device 104A providing a translation request 202 to the host 102 (e.g., an ATS request). The interface manager 112 may receive the translation request 202 and provide data corresponding to the translation request 202 to the memory manager 114. The memory manager 114 may perform a translation 204 of an address provided in the translation request 202 using the translation table(s) 110. For example, the memory manager 114 may retrieve a translated address from the translation table 110. The memory manager 114 may further perform permission recording 206 to grant a permission for memory access. This may include, for example, generating and/or updating one or more permissions bits in an entry of a PAAPT 118 corresponding to the translated address the device 104A, a function, and/or a process. The memory manager 114 may provide the translated address for a translation response 208, which the interface manager 112 may provide to the device 104A.

The device 104A may perform translation caching 210 of information extracted from the translation response 208 (e.g., a value in the translated address field), such as an ATS completion, in the translation cache 120A. Subsequently, the device 104A may perform a cache access 212 of the translation cache 120A to retrieve the cached information for inclusion in an access request 214 (or translated request), such as a DMA request. The device 104A may provide the access request 214 to the host 102. The interface manager 112 may receive the access request 214 and provide data corresponding to the access request 214 to the memory manager 114. The memory manager 114 may perform permission checking 216 using data provided in the access request 214 (e.g., a value in the translated address field). For example, the memory manager 114 may look up the permission using an entity ID corresponding to the device 104A, a function, and/or a process identified from or in association with the access request 214 (e.g., to identify a corresponding PAAPT 118). The memory manager 114 may also look up the permission using a translated address identified from or in association with the access request 214 (e.g., to identify a corresponding entry in the PAAPT 118).

Where the permission grants access to the translated address, the memory manager 114 may determine the access request 214 is authorized. In response to determining the access request 214 is authorized, the memory manager 114 may use the translated address to perform a memory access 218 of the memory 108 at a location corresponding to the translated address (e.g., to retrieve a corresponding page). In embodiments where the memory access 218 is used to retrieve data, the memory manager 114 may provide data retrieved by the memory access 218 for inclusion in an access response(s) 220 sent to the device 104A. Otherwise, the memory manager 114 may provide a status code or other indicator of a successful memory access to the device 104A. In embodiments where a permission does not grant access to the translated address, the access response may include a status code or other indicator of an unsuccessful memory access, such as a fault or error code.

Figure 3:
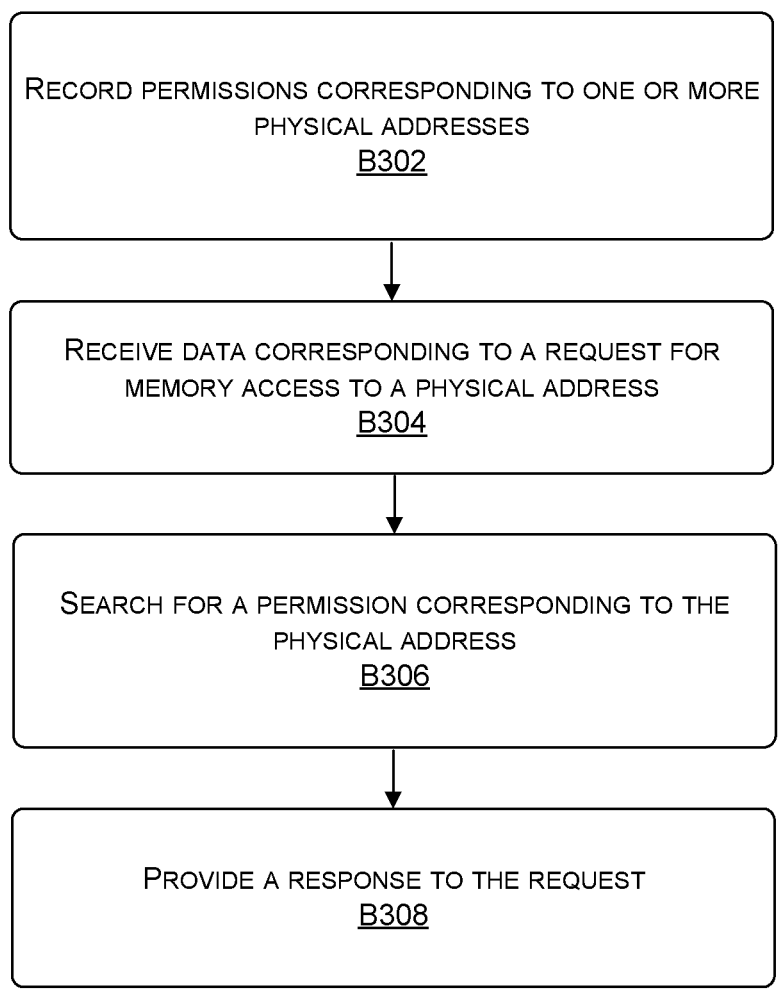
FIG. 3 is a flow diagram showing a method a host may employ for preventing unauthorized access to physical addresses based on searching for a permission corresponding to a physical address, in accordance with some embodiments of the present disclosure.

Now referring to FIG. 3, each block of method 300, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the system of FIG. 1A. However, the methods may additionally or alternatively be executed by any one system, or any combination of systems, including, but not limited to, those described herein.

FIG. 3 is a flow diagram showing a method 300 a host may employ for preventing unauthorized access to physical addresses based on searching for a permission corresponding to a physical address, in accordance with some embodiments of the present disclosure. The method 300, at block B302, includes recording permissions corresponding to one or more physical addresses. For example, the memory manager 114 of the host 102 may record, in entries of one or more PAAPTs 118, permissions granting one or more entities access to one or more physical address, where the entries correspond to the one or more physical address.

The method 300, at block B304, includes receiving data corresponding to a request for memory access to a physical address. For example, the memory manager 114 may receive data corresponding to a request for memory access to a physical address.

The method 300, at block B306, includes searching for a permission corresponding to the physical address. For example, the memory manager 114 may search the one or more PAAPTs 118 for a permission corresponding to the physical address and an entity associated with the request for the memory access.

The method 300, at block B308, includes providing a response to the request. For example, the memory manager 114 may provide a response to the request based at least on a result of the searching of the one or more PAAPTs 118.

Figure 4:
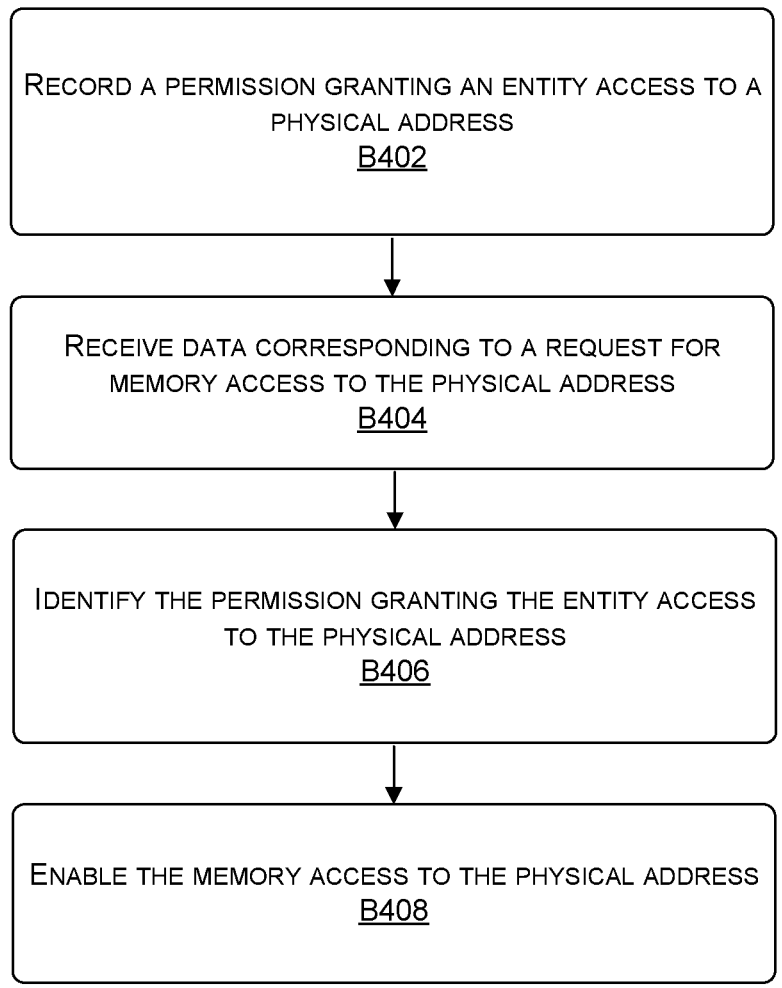
FIG. 4 is a flow diagram showing a method a host may employ for preventing unauthorized access to physical addresses based on identifying a permission grating an entity access to a physical address, in accordance with some embodiments of the present disclosure.

Referring to FIG. 4, FIG. 4 is a flow diagram showing a method 400 a host may employ for preventing unauthorized access to physical addresses based on identifying a permission grating an entity access to a physical address, in accordance with some embodiments of the present disclosure. The method 400, at B402, includes recording a permission granting an entity access to a physical address. For example, the memory manager 114 of the host 102 may record, in a PAAPT 118, a permission granting an entity access to a physical address.

The method 400, at B402, includes receiving data corresponding to a request for memory access to the physical address. For example, the memory manager 114 may receive data corresponding to a request for memory access to the physical address.

The method 400, at B404, includes identifying the permission granting the entity access to the physical address. For example, the memory manager 114 may identify the permission granting the entity access to the physical address based at least on the entity being associated with the request for the memory access.

The method 400, at B406, includes enabling the memory access to the physical address. For example, the memory manager 114 may enable the memory access to the physical address based at least on the identifying of the permission.

Example Computing Device

Figure 5:
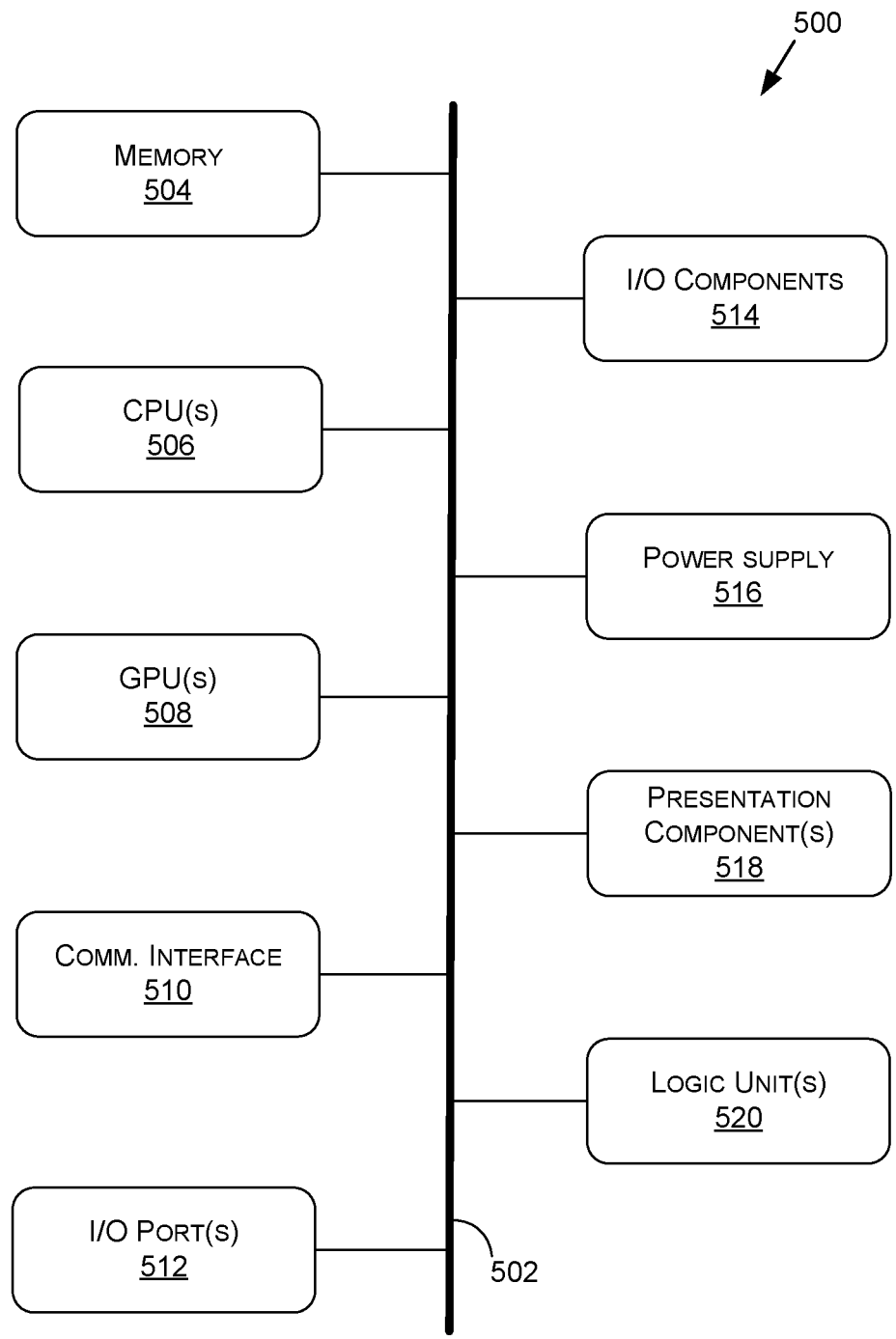
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
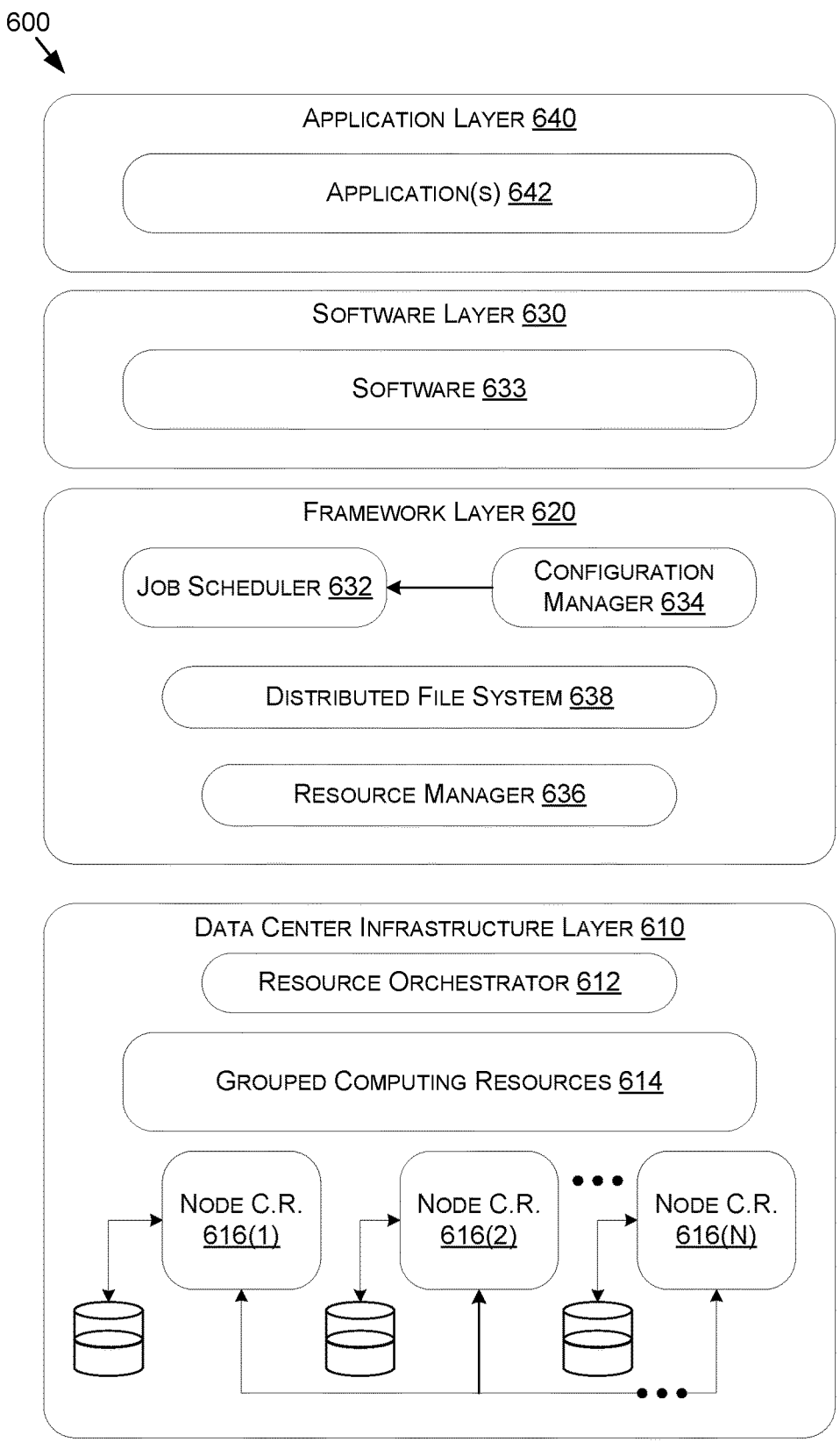
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 633 of software layer 630 and/or one or more application(s) 642 of application layer 640. The software 633 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600.

The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 633 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving, from a first entity, a translation request to translate a virtual address to a physical address, the virtual address being of a virtual memory space owned by a second entity;
determining the first entity is authorized to receive the physical address responsive to the translation request;
based at least on the determining and responsive to the translation request:
recording, in an entry corresponding to the physical address in one or more tables at a host, a permission that enables the first entity to provide the physical address over a host controller interface of the host access to the virtual memory space of the second entity using a direct memory access, wherein a mapping table entry associated with the translation request is accessed to enable verification of the permission using one or more references to the one or more tables stored in the mapping table entry; and
transmitting, to the first entity, the physical address translated from the virtual address using at least one translation table accessed from the mapping table entry;
receiving, over the host controller interface, the physical address in a request from the first entity for access to the virtual memory space of the second entity using the direct memory access, the request being made using the physical address received by the first entity in response to the translation request;
performing the verification that the first entity is authorized to provide the physical address over the host controller interface to access the virtual memory space of the second entity using the direct memory access, the verification including the host accessing the one or more tables using the one or more references stored in the mapping table entry for the permission based at least on associating the mapping table entry with the request; and
providing, over the host controller interface and to the first entity, a response to the request based at least on a result of the verifying verification.

2. The method of claim 1, wherein the accessing uses a stream identifier included in the request to locate the mapping table entry that corresponds to the stream identifier and the one or more references include one or more pointers to the one or more tables, the one or more pointers stored in the mapping table entry.

3. The method of claim 2, wherein the host is configured to point each stream ID corresponding to the first entity to the one or more tables.

4. The method of claim 1, wherein the mapping table entry further stores a stage configuration that disables address translation, and the host performs the verification based at least on determining the stage configuration indicates that the address translation is disabled.

5. The method of claim 1, wherein the accessing includes:
identifying a table from the one or more tables using an entity identifier extracted from the request; and
identifying the permission using the physical address extracted from the request.

6. The method of claim 1, wherein the entry corresponds to a permissions bitmap for a plurality of physical addresses, and the recording includes compressing the permissions bitmap for the plurality of physical addresses in memory.

7. The method of claim 1, wherein responsive to the translation request, the one or more references are stored in the mapping table entry.

8. The method of claim 1, wherein the first entity is authorized to receive the physical address responsive to the translation request based at least on the first entity being moved into a trusted execution environment (TEE) of the second entity.

9. The method of claim 1, wherein the mapping table entry further stores configuration information that selectively enables and disables the verification.

10. A system comprising:
one or more processing units to execute operations comprising:
receiving, from a first entity, a translation request to translate a virtual address to a physical address, the virtual address being of a virtual memory space owned by a second entity;
determining the first entity is authorized to receive the physical address responsive to the translation request;
based at least on the determining and responsive to the translation request:
recording, in an entry corresponding to the physical address in one or more tables at a host, a permission that enables the first entity to provide the physical address over a host controller interface of the host access to the virtual memory space of the second entity using a direct memory access, wherein a mapping table entry associated with the translation request is accessed to enable verification of the permission using one or more references to the one or more tables stored in the mapping table entry; and
transmitting, to the first entity, the physical address translated from the virtual address using at least one translation table accessed from the mapping table entry;
receiving, over the host controller interface, the physical address in a request from the first entity for access to the virtual memory space of the second entity using the direct memory access;
performing the verification that the first entity is authorized to provide the physical address over the host controller interface to access the virtual memory space of the second entity using the direct memory access, the verification including the host accessing the one or more tables using the one or more references stored in the mapping table entry for the permission based at least on associating the mapping table entry with the request; and
enabling the direct memory access to the physical address over the host controller interface based at least on the verification.

11. The system of claim 10, wherein the permission is stored in a table using one or more permissions bits indexed by one or more physical addresses.

12. The system of claim 10, wherein the permission is stored in a transaction mapping table that was used to translate the physical address from a logical address.

13. The system of claim 10, further comprising providing the physical address to the first entity based at least on the determining and responsive to the translation request.

14. The system of claim 10, wherein the identifying of the permission uses an entity identifier extracted from the request, and the physical address extracted from the request.

15. The system of claim 10, wherein the request for access to the virtual memory space of the second entity comprises a direct memory access transfer request.

16. The system of claim 10, wherein the system is comprised in at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center;
- a system including a collaborative creation platform for three-dimensional (3D) content; or
- a system implemented at least partially using cloud computing resources.

17. A processor comprising:
one or more circuits to control access to a virtual memory space of a first entity based at least on a result of a verification performed by a host accessing one or more tables from a mapping table entry for a permission based at least on associating the mapping table entry with a request over a host controller interface of the host, that a second entity is authorized to provide a physical address over the host controller interface to access the virtual memory space using a direct memory access, the request being from the second entity for access to the virtual memory space of the first entity using the direct memory access, the permission recorded in an entry in the one or more tables based at least on determining the second entity is authorized to receive the physical address responsive to a translation request from the second entity, wherein the entry is accessed for the verification from one or more references to the one or more tables stored in the mapping table entry associated with the translation request, the physical address being translated from the virtual address using at least one translation table accessed from the mapping table entry and transmitted to the second entity responsive to the translation request.

18. The processor of claim 17, wherein the permission is of permissions that are stored in the one or more tables using one or more permissions bits indexed by one or more physical addresses.

19. The processor of claim 18, wherein at least one of the one or more tables is stored in a transaction mapping table that was used to translate the physical address from a logical address.

20. The processor of claim 17, wherein the permission is set by a host process of a host, the first entity is a virtual machine managed by the host, and the second entity corresponds to a device external to the host.

* * * * *